(12) United States Patent
Oda et al.

(10) Patent No.: US 11,392,018 B2
(45) Date of Patent: Jul. 19, 2022

(54) PROJECTOR INCLUDING A LIGHT SOURCE UNIT, PROJECTION CONTROL DEVICE INCLUDING A LIGHT SOURCE DRIVING MODULE, AND STORAGE MEDIUM

(71) Applicant: CASIO COMPUTER CO., LTD., Tokyo (JP)

(72) Inventors: Kiyoshi Oda, Hino (JP); Yubi Takashimada, Ome (JP); Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/824,334

(22) Filed: Mar. 19, 2020

(65) Prior Publication Data

US 2020/0326617 A1    Oct. 15, 2020

(30) Foreign Application Priority Data

Apr. 10, 2019   (JP) .............................. JP2019-074716

(51) Int. Cl.
*G03B 21/20*    (2006.01)
*G03B 21/16*    (2006.01)
*G02B 26/00*    (2006.01)

(52) U.S. Cl.
CPC ....... *G03B 21/2053* (2013.01); *G03B 21/204* (2013.01); *G03B 21/2013* (2013.01); *G02B 26/008* (2013.01); *G03B 21/16* (2013.01)

(58) Field of Classification Search
CPC .............. G02B 26/008; G03B 21/2013; G03B 21/204; G03B 21/2053
See application file for complete search history.

(56) References Cited

U.S. PATENT DOCUMENTS 8,021,001 B2 *  9/2011  Iwanaga ............... H04N 1/6088
                                                            353/85
8,403,492 B2 *  3/2013  Shibasaki ............ G03B 21/204
                                                            353/31
(Continued)

FOREIGN PATENT DOCUMENTS

CN        101185021 A     5/2008
CN        107831631 A     3/2018
(Continued)

OTHER PUBLICATIONS

JPO; Application No. 2019-074716; Notification of Reasons for Refusal dated Mar. 18, 2021.

(Continued)

*Primary Examiner* — Bao-Luan Q Le
(74) *Attorney, Agent, or Firm* — Fitch, Even, Tabin & Flannery LLP (57) ABSTRACT

A projector of the present invention includes a light source unit including a first light source emitting light in a first wavelength range and a second light source emitting light in a second wavelength range, a display device for forming image light, a projection optical system for projecting the image light onto a projection target, a timing setting module for changing a ratio of a period shining light in the first wavelength range to a period shining light in the second wavelength range in a spoke period having a plane period emitting light in the first or second wavelength range and a color mixing period emitting both lights in the first and second wavelength ranges for each of a plurality of color modes, and a light source driving module for driving the light source unit based on a setting at the timing setting module.

19 Claims, 7 Drawing Sheets

(56) References Cited

U.S. PATENT DOCUMENTS

| | | | |
|---|---|---|---|
| 8,425,052 B2* | 4/2013 | Peeters | G03B 21/204 |
| | | | 353/84 |
| 9,294,749 B2* | 3/2016 | Oda | H04N 9/3182 |
| 9,927,686 B2* | 3/2018 | Narikawa | G03B 21/206 |
| 10,168,606 B2* | 1/2019 | Ogawa | G02B 5/201 |
| 10,542,240 B2* | 1/2020 | Murakami | H04N 9/3158 |
| 10,802,388 B2* | 10/2020 | Narikawa | G03B 21/2033 |
| 10,845,689 B2* | 11/2020 | Ogawa | F21K 9/64 |
| 2006/0268236 A1* | 11/2006 | Prince | H04N 9/3182 |
| | | | 353/31 |
| 2008/0055493 A1* | 3/2008 | Hanano | H05B 45/37 |
| | | | 349/9 |
| 2010/0315604 A1* | 12/2010 | Peeters | G03B 21/204 |
| | | | 353/84 |
| 2010/0328554 A1* | 12/2010 | Shibasaki | H04N 9/3161 |
| | | | 348/760 |
| 2013/0057661 A1* | 3/2013 | Oda | G09G 3/003 |
| | | | 348/51 |
| 2014/0063468 A1* | 3/2014 | Narikawa | H04N 9/3182 |
| | | | 353/31 |
| 2018/0081263 A1* | 3/2018 | Ogawa | G03B 21/2053 |
| 2018/0164668 A1* | 6/2018 | Narikawa | G03B 33/08 |
| 2019/0025683 A1* | 1/2019 | Ogawa | G03B 21/2053 |
| 2019/0199981 A1* | 6/2019 | Murakami | G03B 21/008 |

FOREIGN PATENT DOCUMENTS

| | | |
|---|---|---|
| JP | 2005-331705 A | 12/2005 |
| JP | 2008-546010 A | 12/2008 |
| JP | 2013-88574 A | 5/2013 |
| JP | 2014-48542 A | 3/2014 |
| JP | 2017-3643 A | 1/2017 |
| JP | 2017-072854 A | 4/2017 |
| JP | 2017-201834 A | 11/2017 |
| JP | 2018-045199 A | 3/2018 |

OTHER PUBLICATIONS

CNIPA; Application No. 202010199528.1; Notification of the First Office Action dated Jun. 3, 2021.

* cited by examiner

PROJECTOR INCLUDING A LIGHT SOURCE UNIT, PROJECTION CONTROL DEVICE INCLUDING A LIGHT SOURCE DRIVING MODULE, AND STORAGE MEDIUM

CROSS-REFERENCE TO RELATED APPLICATION

This patent application is based upon and claims the benefit of priority under 35 USC 119 from Japanese Patent Application No. 2019-074716 filed on Apr. 10, 2019, the entire disclosure of which, including the specification, claims, drawings, and abstract thereof, is incorporated herein by reference in its entirety.

BACKGROUND OF THE INVENTION

Field of the Invention

The present invention relates to a projector, a projection control device, and a storage medium.

Description of the Related Art

Conventionally, there has been disclosed a projector in which a light source unit including light emitting devices configured to emit colors of light are driven in time division. For instance, a projector disclosed in Japanese Patent Laid-Open No. 2018-45199 includes a luminescent wheel device having a transmission section, which is configured to transmit diffusely light having a wavelength in the blue wavelength range or simply light in the blue wavelength range emitted from an excitation light shining device, and a luminescent light emitting area, and a color wheel device. Then, the luminescent wheel device and the color wheel device are driven rotationally in synchronism with each other, and a color filter of the color wheel device transmits light in a predetermined wavelength range.

It is often desired that a projector has various color modes such as a mode in which stress is laid on brightness of projected light, a mode in which stress is laid on coloring of a projected image, and the like so that a clear image can be projected even in, for example, a bright room. In this case, a spoke period, which a time period during which segments of light emitted by a light source unit are switched over, is often used as a time period during which colors of light from the light source unit are mixed up. Then, in order to realize the various color modes, it is often desired that an allocation angle of the spoke period is changed. However, for example, in the case that the luminescent wheel device and the color wheel device are provided in such a manner that both the luminescent wheel device and the color wheel device operate in synchronism with each other, there may be a situation in which the degree of freedom in setting an allocation angle for the spoke period is limited.

SUMMARY OF THE INVENTION

The present invention has been made in view of the situations described above, and an object of the present invention is to provide a projector, a projection control device, and a storage medium which can change brightness even in the case that the degree of freedom in setting an allocation angle for a spoke period is limited.

According to an aspect of the present invention, there is provided a projector including a light source unit comprising a first light source configured to emit light in a first wavelength range and a second light source configured to emit light in a second wavelength range, a display device on to which light source light is shined from the light source unit to form image light, a projection optical system configured to project the image light emitted from the display device onto a projection target, a timing setting module configured to change a ratio of a period during which light in the first wavelength range is shined to a period during which light in the second wavelength range is shined in a spoke period having a plane period during which either of light in the first wavelength range and light in the second wavelength range is shined and a color mixing period during which both light in the first wavelength range and light in the second wavelength range are shined for each of a plurality of color modes, and a light source driving module configured to drive the light source unit based on a setting at the timing setting module.

According to another aspect of the present invention, there is provided a projection control device including a timing setting module configured to change a ratio of a period during which light in a first wavelength range is shined to a period during which light in a second wavelength range is shined, the light in the first wavelength range and the light in the second wavelength range being emitted from a light source unit including a first light source configured to emit light in the first wavelength range and a second light source configured to emit light in the second wavelength range, in a spoke period having a plane period during which either of light in the first wavelength range and light in the second wavelength range is shined and a color mixing period during which both light in the first wavelength range and light in the second wavelength range are shined for each of a plurality of color modes, and a light source driving module configured to drive the light source unit based on a setting at the timing setting module.

According to a further aspect of the present invention, there is provided a storage medium that a computer can read, the storage medium being configured to cause the computer to function as a timing setting module configured to change a ratio of a period during which light in a first wavelength range is shined to a period during which light in a second wavelength range is shined, the light in the first wavelength range and the light in the second wavelength range being emitted from a light source unit including a first light source configured to emit light in the first wavelength range and a second light source configured to emit light in the second wavelength range, in a spoke period having a plane period during which either of light in the first wavelength range and light in the second wavelength range is shined and a color mixing period during which both light in the first wavelength range and light in the second wavelength range are shined for each of a plurality of color modes, and a light source driving module configured to drive the light source unit based on a setting at the timing setting module.

DETAILED DESCRIPTION OF THE PREFERRED EMBODIMENT

Figure 1:
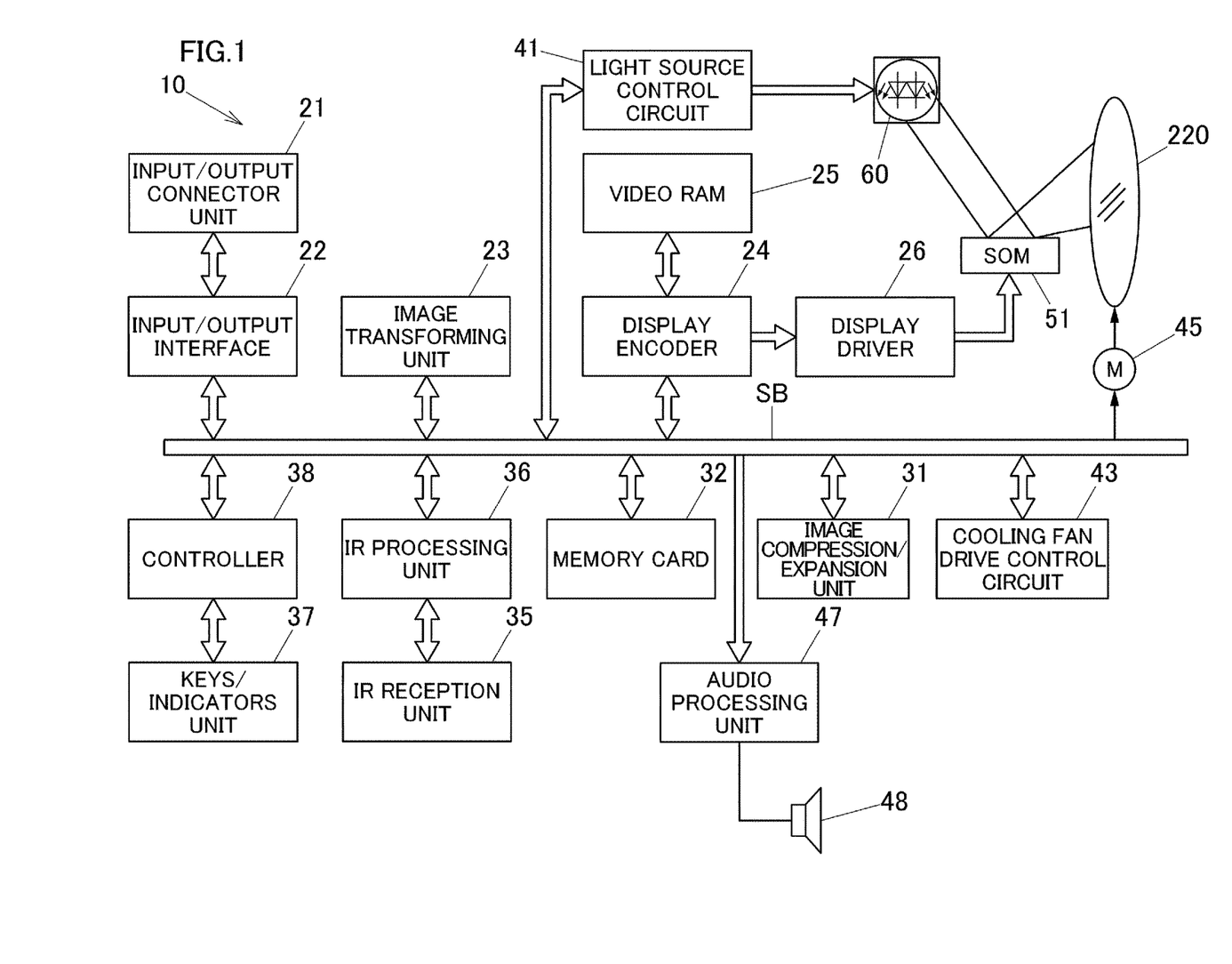
FIG. 1 is a functional circuit block diagram of a projector according to an embodiment of the present invention.

Hereinafter, referring to accompanying drawings, an embodiment of the present invention will be described. FIG. 1 is a functional block diagram of a projector 10 (a projection control device). The projector 10 includes a controller 38, an input/output interface 22, an image transforming unit 23, a display encoder 24, a display driver 26, and the like. Image signals of various standards which are inputted from an input/output connector unit 21 are sent to the image transforming unit 23 via the input/output interface 22 and a system bus (SB), and the image signals so sent are transformed to be unified into an image signal of a predetermined format which is suitable for display in the image transforming unit 23 by the projection control device. Thereafter, the unified image signal is outputted to the display encoder 24.

The controller 38 governs the control of operations of individual circuitries inside the projector 10 and includes CPU as an arithmetic-logic unit, ROM that stores fixedly operation programs such as various settings, RAM that is used as a work memory, and the like.

The display encoder 24 deploys the image signal inputted thereinto on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate corresponding to the image signal outputted from the display encoder 24.

The projector 10 includes a light source unit 60 for emitting light having a wavelength in the blue wavelength range or simply light in the blue wavelength range (light in a first wavelength range), light having a wavelength in the green wavelength range or simply light in the green wavelength range (light in a second wavelength range), and light having a wavelength in the red wavelength range or simply light in the red wavelength range (light in a third wavelength range). The predetermined light in the wavelength range of light in the green wavelength range is included in light in the red wavelength range. Light emitted from the light source unit 60 is shined on to the display device 51 and is then reflected by the display device 51, forming image light. The image light formed by the reflection light from the display device 51 is projected on to a screen or the like by way of a projection optical system 220, which will be described later.

The projection optical system 220 includes a movable lens group. The movable lens group is driven by a lens motor 45 for zooming and focusing.

With the projector 10 set in a reproducing mode, an image compression/expansion unit 31 reads out image data recorded in a memory card 32 and expands the individual image data that makes up a series of dynamic images frame by frame. Additionally, the image compression/expansion unit 31 outputs the expanded image data to the display encoder 24 by way of the image transforming unit 23 and causes the display encoder 24 to display the dynamic images based on the image data stored in the memory card 32.

A keys/indicators unit 37 is provided on a casing of the projector 10. Operation signals from the keys/indicators unit 37 are sent out directly to the controller 38. Key operation signals from a remote controller are received by an IR reception unit 35 and are then demodulated at an Ir processing unit 36 for output to the controller 38.

An audio processing unit 47 is connected to the controller 38 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41. The light source control circuit 41 controls the light source unit 60 in such a manner as to cause the light source unit 60 to emit light source light in predetermined wavelength ranges required in generating an image.

Additionally, the controller 38 can cause a cooling fan drive control circuit 43 to detect temperatures in light source unit 60 with a plurality of temperature sensors provided in the light source unit 60 and the like so as to control revolution speeds of cooling fans based on the results of the temperature detections. Further, the controller 38 can also cause the cooling fan drive control circuit 43 to keep the cooling fans revolving by use of a timer or the like even after a power supply to a main body of the projector 10 is switched off. Alternatively, the controller 38 can cause the cooling fan drive control circuit 43 to switch off the power supply of the main body of the projector 10 depending upon the results of the temperature detections by the temperature sensors.

Figure 2:
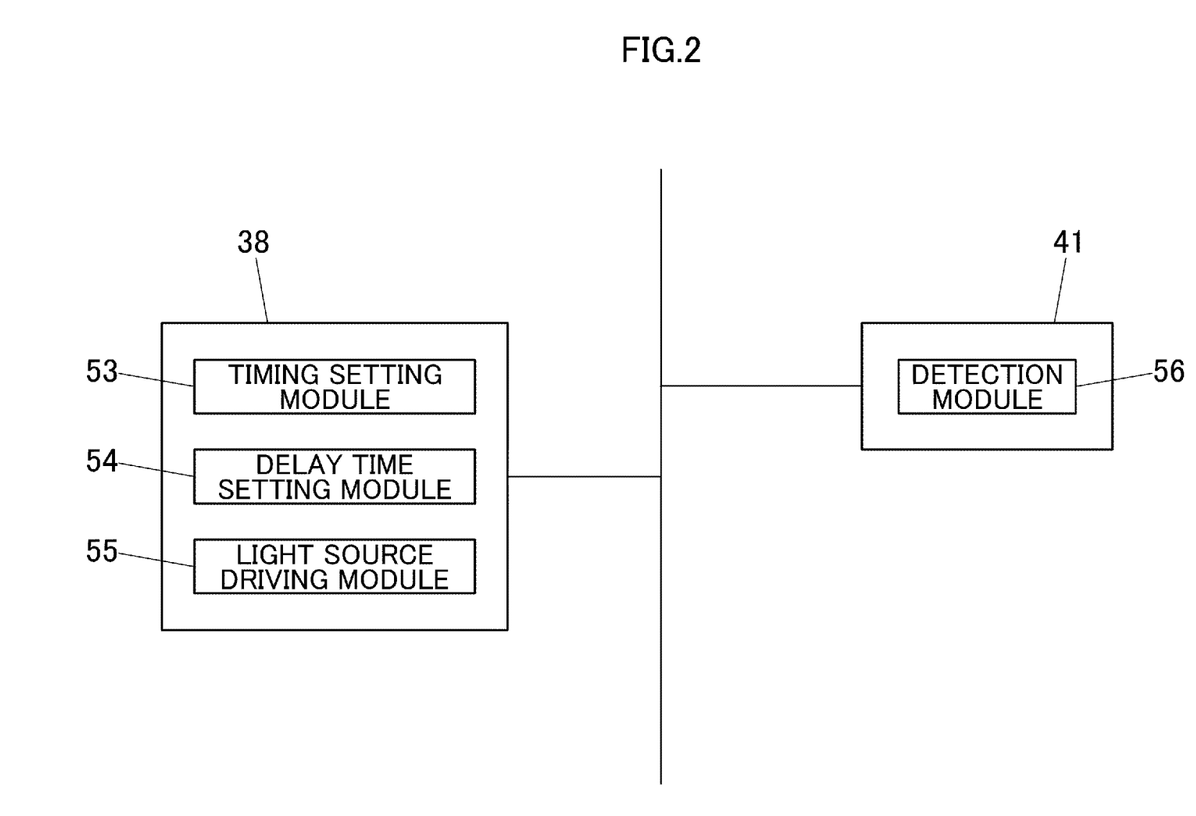
FIG. 2 is a functional circuit block diagram showing in detail a controller and a light source control circuit of the projector according to the embodiment of the present invention.

As shown in FIG. 2, the controller 38 of the projection control device, which is the projector 10 in this embodiment, includes a timing setting module 53, a delay time setting module 54, and a light source driving module 55. The light source control circuit 41 includes a detection module 56 configured to detect information on an amount of each color of light emitted from the projection optical system 220. These modules will be described in detail later.

Figure 3:
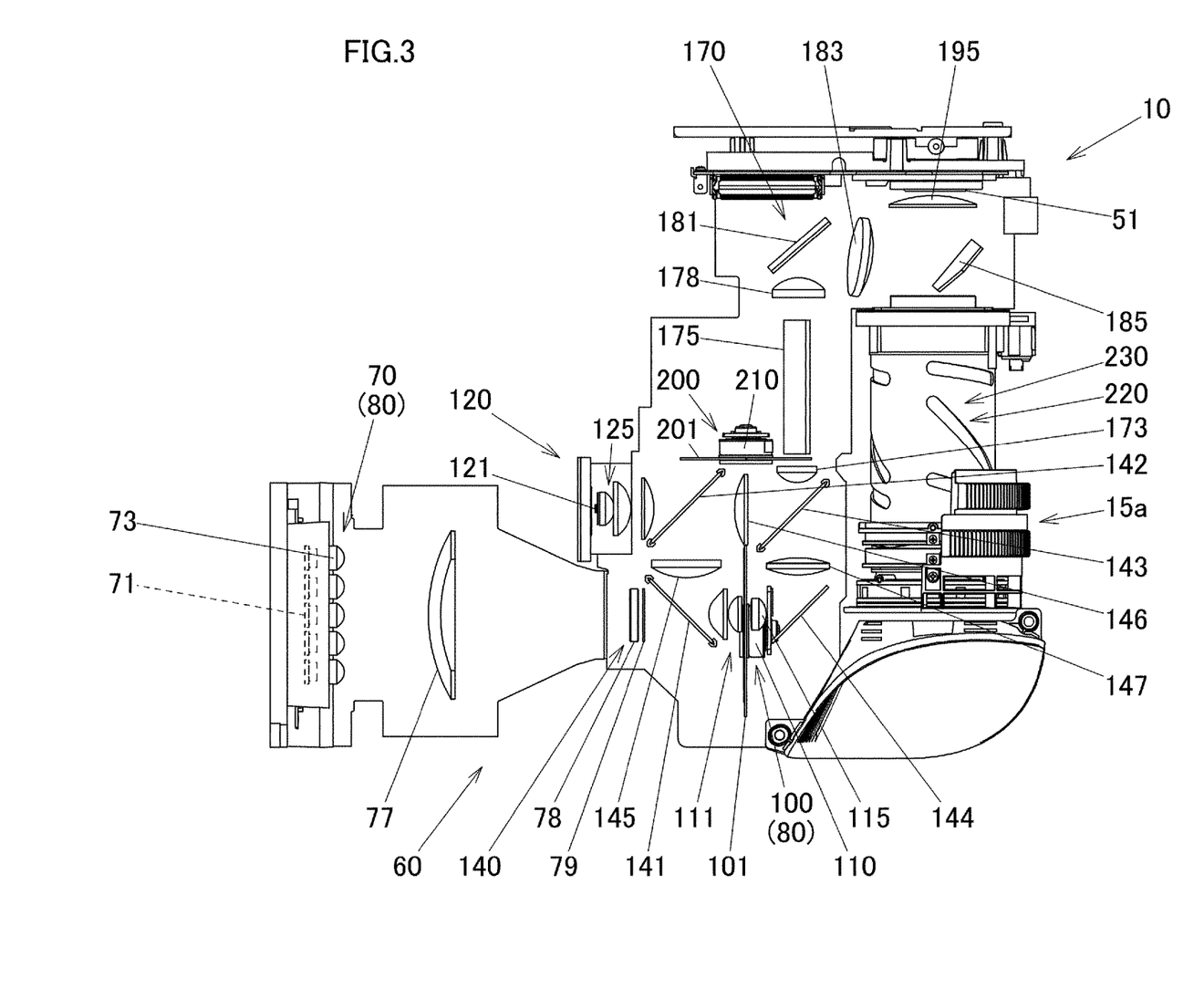
FIG. 3 is a schematic plan view showing an internal structure of a light source unit of the projector according to the embodiment of the present invention.

Next, referring to FIG. 3, an internal structure of the light source unit 60 of the projector 10 will be described. In the following description, when right and left directions are referred to in relation to the projector 10, they denote right and left directions with respect to a projecting direction of the projector 10, and when front and rear directions are referred to similarly, they denote front and rear directions with respect to a direction of the projector 10 towards a screen and a traveling direction of a pencil of light.

The light source unit 60 includes an excitation light shining device 70, which constitutes a light source for light in the blue wavelength range and also functions as an excitation light source, a green light source device 80, which constitutes a light source for light in the green wavelength range, a red light source device 120, which constitutes a light source for light in the red wavelength range, and a color wheel device 200. The green light source device 80 is made up of the excitation light shining device 70 and a luminescent wheel device 100.

A light guiding optical system 140 is disposed in the light source unit 60, the light guiding optical system 140 guiding lights in the red, green and blue wavelength ranges. The light guiding optical system 140 is configured to guide lights emitted, respectively, from the excitation light shining device 70, the green light source device 80, and the red light source device 120 to a light source optical system 170. The excitation light shining device 70 includes a plurality of blue laser diodes 71 (a first light source), which are semiconductor light emitting elements, collective lenses 77, 78, and a diffuse plate 79.

Collimator lenses 73 are disposed individually on optical axes of the blue laser diodes 71 to convert lights emitted from the corresponding blue laser diodes 71 into parallel lights in order to enhance the directivity of the lights so emitted. The collective lens 77 and the collective lens 78 collect pencils of light emitted from the blue laser diodes 71 in one direction and emit the pencils of light so contracted to the diffuse plate 79. The diffuse plate 79 transmits diffusely the pencils of light in the blue wavelength range which are incident thereon towards a first dichroic mirror 141 disposed on a side of the diffuse plate 79 that faces a luminescent wheel 101.

The luminescent wheel device 100 is disposed on an optical path of excitation light emitted from the excitation light shining device 70. The luminescent wheel device 100 includes the luminescent wheel 101, a motor 110, a collective lens group 111, and a collective lens 115. The luminescent wheel 101 is disposed in such a manner as to lie at right angles to an axis of light emitted from the excitation light shining device 70 so that a position on the luminescent wheel 101 constitutes a light shining position S (refer to FIG. 4A). The motor 110 is disposed below the collective lens group 111 and the collective lens 115 and drives the luminescent wheel 101 rotationally.

Figure 4A:
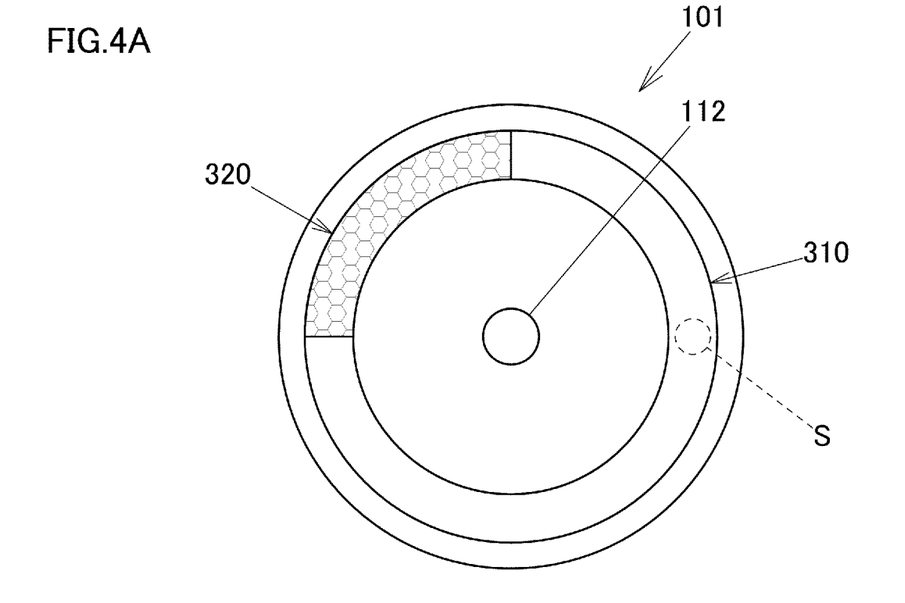
FIG. 4A is a schematic front view of a luminescent wheel of the light source unit of the projector according to the embodiment of the present invention.

The luminescent wheel 101 has a circular disk shape as shown in FIG. 4A and is fixed to the motor 110 at a bearing 112 provided at a central portion of the circular disk shape, whereby the luminescent wheel 101 is driven to rotate by the motor 110. The luminescent wheel 101 includes a luminescent light emitting area 310 (a second light source) and a transmission area 320 which are provided to be aligned end to end in a circumferential direction on the luminescent wheel 101. A metallic base material such as copper or aluminum can be used as a base material for the luminescent wheel 101. A surface of the base material that is oriented towards the excitation light shining device 70 is mirror finished through silver deposition or the like. A green luminescent material layer formed on the mirror finished surface of the base material is formed on the luminescent light emitting area 310. The luminescent light emitting area 310 receives light in the blue wavelength range emitted from the excitation light shining device 70 as excitation light and then emits luminescent light in the green wavelength range in every direction. One part of the luminescent light so emitted is emitted directly towards the collective lens group 111, while the other part of the luminescent light is reflected on a reflection surface of the luminescent wheel 101 to thereafter be emitted towards the collective lens group 111.

The transmission area 320 of the luminescent wheel 101 can be formed by fitting a transparent base material having a light transmission characteristic in a cut-out portion formed in the base material of the luminescent wheel 101. The transparent base material is formed of a transparent material such as glass or resin. Additionally, a diffuse layer may be provided on a surface of a side of the transparent base material on to which light in the blue wavelength range is shined or an opposite side thereto. The diffuse layer can be provided by forming minute irregularities on the relevant surface through sandblasting. Light in the blue wavelength range emitted from the excitation light shining device 70 to be incident on the transmission area 320 is transmitted or transmitted diffusely through the transmission area 320 and is then incident on the collective lens 115.

Returning to FIG. 3, the collective lens group 111 collects pencils of light in the blue wavelength range emitted from the excitation light shining device 70 to the luminescent wheel 101 and collects luminescent light emitted from the luminescent wheel 101. The collective lens 115 collects a pencil of light emitted from the luminescent wheel 101.

The red light source device 120 includes a red light emitting diode 121 (a third light source), which is a semiconductor light emitting device, disposed in such a manner as to be parallel to the axis of light emitted from the blue laser diodes 71 and a collective lens group 125 that collects light in the red wavelength range emitted from the red light emitting diode 121. The red light source device 120 is disposed in such a manner that an axis of light in the red wavelength range emitted from the red light emitting diode 121 intersects an axis of light in the green wavelength range emitted from the luminescent wheel 101 and reflected by the first dichroic mirror 141.

The light guiding optical system 140 includes the first dichroic mirror 141, a second dichroic mirror 142, a third dichroic mirror 143, collective lenses 145, 146, 147 that collect pencils of light, a reflection mirror 144 that turns axes of pencils of light into a single light axis, and the like. Hereinafter, the individual constituent members will be described.

The first dichroic mirror 141 is disposed between the diffuse plate 79 and the collective lens group 111. The first dichroic mirror 141 transmits light in the blue wavelength range towards the collective lens group 111 and reflects light in the green wavelength range in the direction of the collective lens 145 to thereby turn an axis of the light in the green wavelength range trough 90 degrees.

The second dichroic mirror 142 constitutes a combining device that combines light in the green wavelength range and light in the red wavelength range into the same light axis and reflects light in the green wavelength range, while transmitting light in the red wavelength range. Light in the green wavelength range that is reflected by the first dichroic mirror 141 is collected by the collective lens 145 and is then incident on the second dichroic mirror 142.

The light in the green wavelength range reflected by the second dichroic mirror 142 is collected by the collective lens 146 and is then incident on the third dichroic mirror 143 disposed on a light emerging side of the collective lens 146. The third dichroic mirror 143 reflects light in the red wavelength range and light in the green wavelength range and transmits light in the blue wavelength range. Consequently, the third dichroic mirror 143 reflects the light in the red wavelength range and the light in the green wavelength range that the collective lens 146 collects to the collective lens 173, so that the third dichroic mirror 143 guides the light in the red wavelength range and the light in the green wavelength range in the way described above.

When the light shining position S on the luminescent wheel 101 on to which light in the blue wavelength range is shined stays on the transmission area 320 (refer to FIG. 4A), light in the blue wavelength range emitted from blue laser diodes 71 is transmitted or transmitted diffusely through the luminescent wheel 101 and is then collected by the collective lens 115 to thereafter be guided to the reflection mirror 144. The reflection mirror 144 is disposed on an axis of light in the blue wavelength range that is transmitted or transmitted diffusely through the luminescent wheel 101. The reflection mirror 144 reflects light in the blue wavelength range and guides its light axis to the collective lens 147 by turning the light axis through 90 degrees. The third dichroic mirror 143 transmits the light in the blue wavelength range that is collected by the collective lens 147 to guide it towards a collective lens 173.

The light source optical system 170 includes the collective lens 173, alight tunnel 175, a collective lens 178, a light axis turning mirror 181, a collective lens 183, a shining mirror 185, and a condenser lens 195. The condenser lens 195 emits image light emitted from the display device 51 disposed on a rear side of the condenser lens 195 towards the projection optical system. 220, and therefore, the condenser lens 195 also constitutes part of the projection optical system 220.

The collective lens 173 is disposed at an end of the light tunnel 175 that lies to face the third dichroic mirror 143. The collective lens 173 collects light in the green wavelength range, light in the blue wavelength range and light in the red wavelength range that are guided from the third dichroic mirror 143. The lights in the green, blue and red wavelength ranges that are collected by the collective lens 173 are shined on to a color wheel 201 of the color wheel device 200.

The color wheel device 200 includes the color wheel 201 and a motor 210 that drives the color wheel 201 rotationally. The color wheel device 200 is disposed between the collective lens 173 and the light tunnel 175 in such a manner that an axis of a pencil of light emitted from the collective lens 173 is at right angles to a shining surface on the color wheel 201.

Figure 4B:
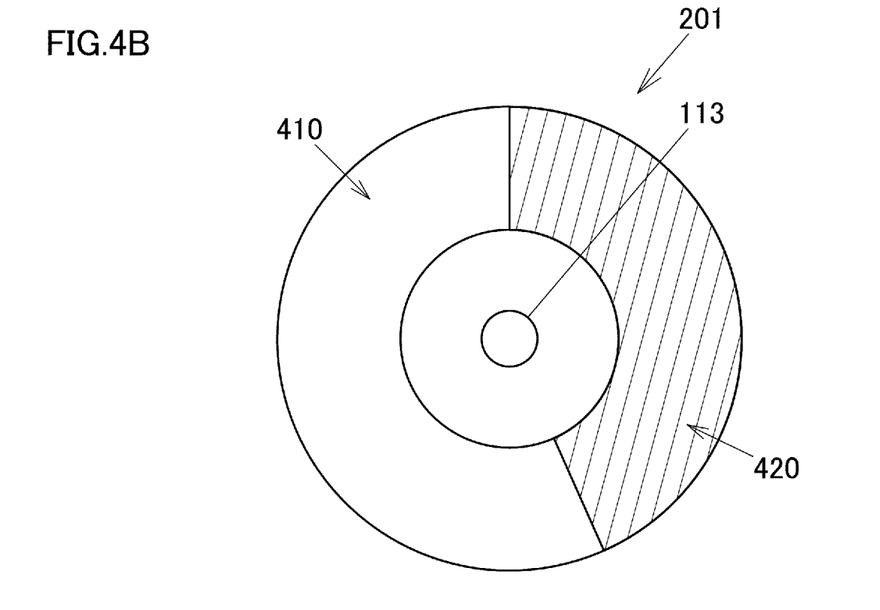
FIG. 4B is a schematic front view of a color wheel of the light source unit of the projector of the embodiment of the present invention.

The color wheel 201 has a circular disk shape as shown in FIG. 4B and is fixed to a shaft portion of the motor 210 at a bearing 113 provided at a central portion of the color wheel 201, whereby the color wheel 201 is driven rotationally by the motor 210. The color wheel 201 includes an all color transmission area 410 and a blue and red transmission area 420 that are provided end to end in a circumferential direction. The all color transmission area 410 is formed of transparent glass or a transparent resin plate and can transmit all of light in the blue wavelength range, light in the green wavelength range, and light in the red wavelength range. The blue and red transmission area 420 is formed by a color filter and can transmit light in the blue wavelength range and light in the red wavelength range. Light in the blue wavelength range, light in the green wavelength range, and light in the red wavelength range that are incident on the color wheel 201 are transmitted through the all color transmission area 410 or the blue and red transmission area 420 to be dimmed and are then guided towards the light tunnel 175 shown in FIG. 3. A pencil of light incident on the light tunnel 175 becomes a pencil of light whose luminous intensity is distributed uniformly within the light tunnel 175.

The collective lens 178 is disposed on an optical axis of the light tunnel 175 in a position to a rear end of the light tunnel 175. The light axis turning mirror 181 is disposed rearwards of the collective lens 178. A pencil of light emerging from an emerging port of the light tunnel 175 is collected at the collective lens 178 and is then reflected towards a left panel by the light axis turning mirror 181.

The pencil of light reflected by the light axis turning mirror 181 is collected by the collective lens 183, whereafter the pencil of light is shined onto the display device 51, which is a digital micromirror device or DMD, at a predetermined angle via the condenser lens 195 by the shining mirror 185.

The light source light shined on to an image forming plane of the display device 51 by the light source optical system 170 is reflected on the image forming plane of the display device 51 and is projected on to a screen via the projection optical system 220 as projected light. Here, the projection optical system 220 is made up of the condenser lens 195, and the movable lens group and a fixed lens group which are provided in a lens barrel 230. The movable lens group is configured as a variable-focus lens and can be adjusted for zooming and focusing. The movable lens group is made to move automatically by the lens motor 45 or manually by a projected image control unit 15a.

The luminescent wheel 101 and the color wheel 201 can be rotated in synchronization with each other by configuring the projector 10 in the way described heretofore, and when light is emitted at arbitrary timings individually from the excitation light shining device 70 and the red light source device 120, lights in the green, blue and red wavelength ranges are incident on the collective lens 173 via the light guiding optical system 140 and are then incident on the display device 51 via the light source optical system 170. As a result, the display device 51 displays green, blue and red lights in time division in accordance with data, thereby making it possible to project a color image on to the screen.

Figure 5:
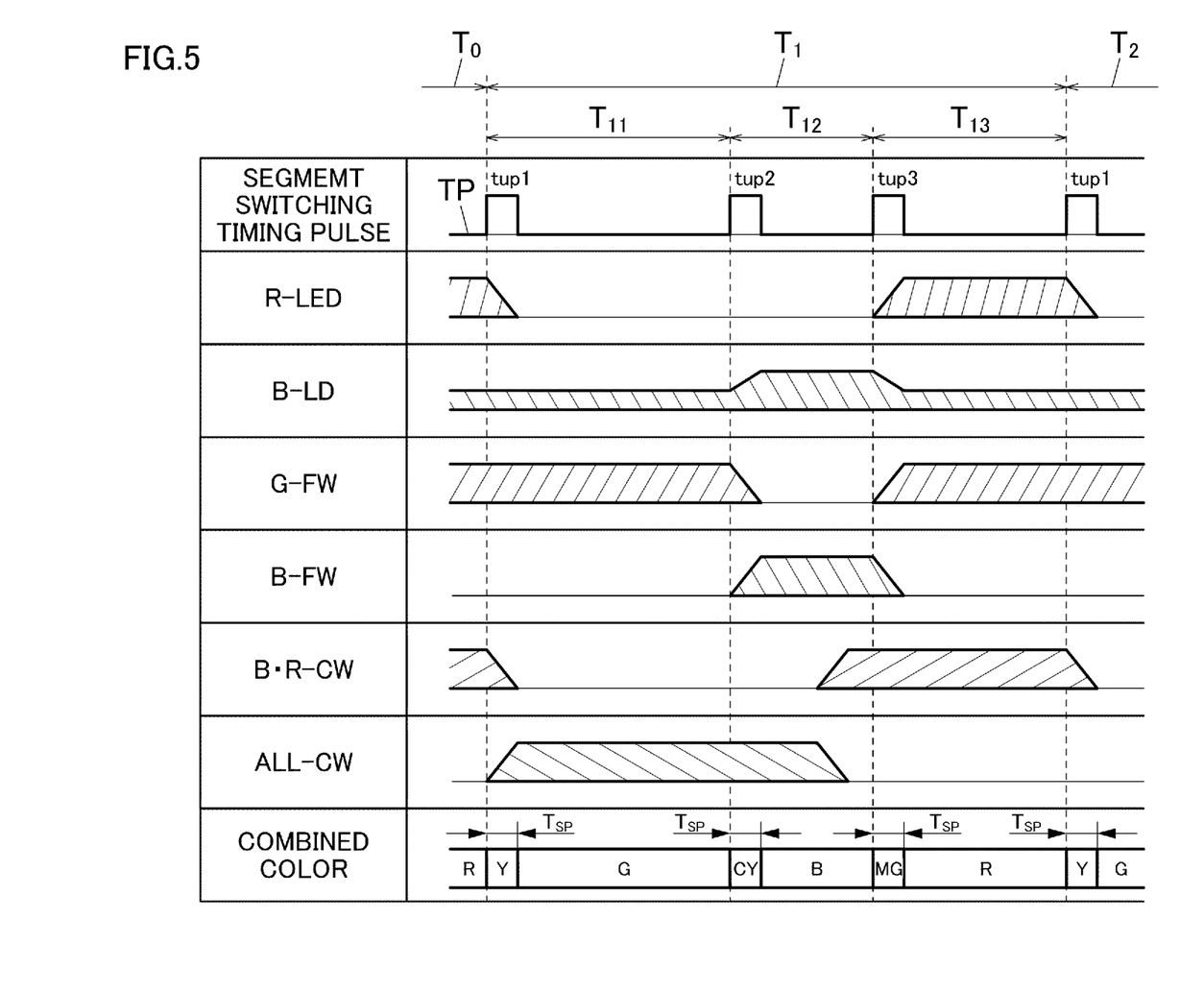
FIG. 5 is a timing chart of the projector according to the embodiment of the present invention.

FIG. 5 shows an example of a time chart in which the light source unit 60 emits a combined color of light source light by switching segments for light in the red wavelength range (R), light in the green wavelength range (G), and light in the blue wavelength range (B) in synchronism with a building-up timing tup (tup1, tup2, tup3) of a segment switching timing pulse TP from the controller 38 within a period of a unit image frame T (T0, T1, T2, . . . ). In FIG. 5, the red light source device 120 (the red light emitting diode 121) is denoted by R-LED, the excitation light shining device 70 (the blue laser diode 71) is denoted by B-LD, the luminescent light emitting area 310 of the luminescent wheel device 100 (the luminescent wheel 101) is denoted by G-FW, the transmission area 320 of the luminescent wheel device 100 (the luminescent wheel 101) is denoted by B-FW, the blue and red transmission area 420 of the color wheel device 200 (the color wheel 201) is denoted by B•R-CW, and the all color transmission area 410 of the color wheel device 200 (the color wheel 201) is denoted by ALL-CW. Here, heights of the red light source device 120 (R-LED), the excitation light shining device 70 (B-LD), the luminescent light emitting area 310 (G-FW), the transmission area 320 (B-FW), the blue and red transmission area 420 (B•R-CW), and the all color transmission area 410 (ALL-CW) schematically denote amounts of light that they emit.

Additionally, a given time from the building-up timing tup (tup1, tup2, tup3) of the segment switching timing pulse TP is set as a spoke period Tsp. The timing tup and the spoke period Tsp are set by the timing setting module 53. In this embodiment, a mixed color of light is set so as to be emitted within the spoke period Tsp.

For example, in a period T11, the red light source device 20 (R-LED) that keeps illuminated from a previous period T0 is started to be turned off at a building-up timing tup1 of the segment switching timing pulse TP. On the other hand, in the color wheel device 200, the blue and red transmission area 420 (B•R-CW) is switched to the all color transmission area 410 (ALL-CW). The light emitted from the excitation light shining device 70 (B-LD) is shined on to the luminescent light emitting area 310 (G-FW), causing the luminescent light emitting area 310 (G-FW) to emit luminescent light in the green wavelength range. Consequently, an amount of light in the red wavelength range (a red component (in a predetermined wavelength range) that is taken out as a result of light in the red wavelength range from the red light source device 120 (R-LED) and light in the green wavelength range from the luminescent light emitting area 310 (G-FW) passing through the blue and red transmission area 420) decreases, while an amount of light in the green wavelength range that passes through the all color transmission area 410 (ALL-CW) increases. As a result, in the spoke period Tsp in the period T11, light in the red wavelength range and light in the green wavelength range are mixed up to emit light in a yellow wavelength range (Y). In the case that the spoke period for light in the yellow wavelength range (Y) is six degrees, it is desired that an amount of light in the red wavelength range emitted from the red light source device 120 (R-LED) at a point in time when the spoke period is three degrees is a half of an amount of light in the red wavelength range emitted from the red light source device 120 (R-LED) when the light source device is turned on. Then, the red light source device 120 (R-LED) is turned off completely after the spoke period Tsp in the period T11 is over, and the light transmission areas on the color wheel 201 are switched completely from the blue and red transmission area 420 (B•R-CW) to the all color transmission area 410 (ALL-CW). Then, light in the green wavelength range (G) is emitted from the light source unit 60.

In a period T12, a driving current of the excitation light shining device 70 (B-LD) is increased at a building-up timing tup2, whereby an amount of light in the blue wavelength range emitted from the excitation light shining device 70 (B-LD) is increased. On the other hand, in the luminescent wheel 101, the areas are switched from the luminescent light emitting area 310 (G-FW) to the transmission area 320 (B-FW). As a result, in a spoke period Tsp in the period T12, light in the blue wavelength range and light in the green wavelength range are mixed up to emit light in a cyan wavelength range (CY). Light in the blue wavelength range (B) is emitted after the spoke period Tsp in the period T12 is over. The light transmission areas on the color wheel 201 are switched from the all color transmission area 410 (ALL-CW) to the blue and red transmission area 420 (B•R-CW) during the period when light in the blue wavelength range (B) is emitted (that is, during the period T12).

In a period T13, the red light source device 120 (R-LED) starts to be turned on at a building-up timing tup3. On the other hand, the driving current value of the excitation light shining device 70 (B-LD) is decreased, whereby an amount of light in the blue wavelength range emitted from the excitation light shining device 70 decreases. The transmission areas on the luminescent wheel 101 are switched over from the transmission area 320 (B-FW) to the luminescent light emitting area 310 (G-FW), whereby luminescent light in the green wavelength range is emitted. The luminescent light in the green wavelength range so emitted is transmitted through the blue and red transmission area 420 (B•R-CW), whereby a red wavelength component is taken out. As a result, in a spoke period Tsp in the period T13, light in the red wavelength range (light in the red wavelength range from the red light source device 120 (R-LED) and light in the red wavelength component (the predetermined wavelength range) taken out from light in the green wavelength range when it is transmitted through the blue and red transmission area 420 (B•R-CW)) and light in the blue wavelength range that is transmitted through the transmission area 320 (B-FW) are mixed up to emit light in a magenta wavelength range (MG). Light in the red wavelength range (R) is emitted after the spoke period Tsp of the period T13 is over.

In the time chart shown in FIG. 5, although the current value while the excitation light shining device 70 illuminates the luminescent light emitting area 310 is reduced, it may be set so that the current value while the excitation light shining device 70 illuminates the luminescent light emitting area 310 is increased and the current value while light from the excitation light shining device 70 is transmitted through the transmission area 320 is decreased.

The projector 10 can provide a "brightness-stressed" color mode in which projected light is brightened by making use of, for example, light in the yellow wavelength range (Y) emitted during the spoke period Tsp in the period T11. Additionally, the projector 10 can provide a "color-stressed mode" in which a period when light in the red wavelength range is emitted is lengthened by causing light in the blue wavelength range to pass only through the all color transmission area 410 (ALL-CW) when the timing at which the light transmission areas on the color wheel 201 are switched from the all color transmission area 410 (ALL-CW) to the blue and red transmission area 420 (B•R-CW) in the period T12 is matched with the building-up timing tup3. In addition, various color modes can be set by controlling the amounts of light in the blue wavelength range and light in the red wavelength range by controlling the driving current values of the blue laser diodes 71 and the red light emitting diode 121.

In the present embodiment, various color modes (brightness control) can be realized by changing a color balance in a spoke period Tsp. Here, realizing various color modes by changing a color balance in a spoke period will be described by taking a case that in a total angle of 360 degrees of unit image frames T (T0, T1, T2, . . . ), a spoke period Tsp is set at 12 degrees with a predetermined angle unit controlled by the display device 51 being referred to as 6 degrees as an example.

Figure 6A:
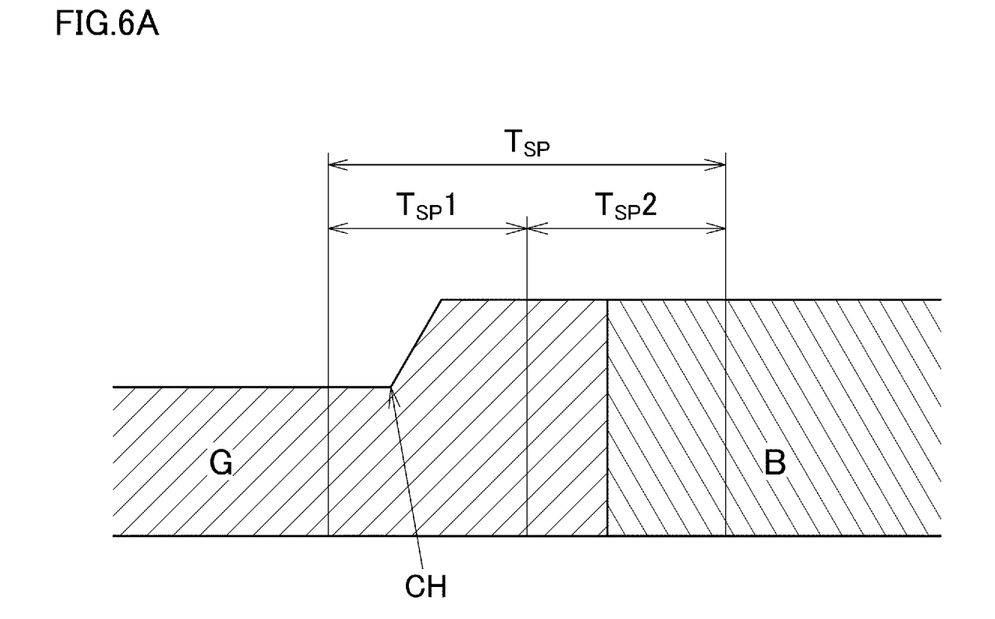
FIG. 6A is an enlarged timing chart of a predetermined spoke period of the projector according to the embodiment of the present invention, the predetermined spoke period shown being a spoke period in a color-stressed color mode.
Figure 6B:
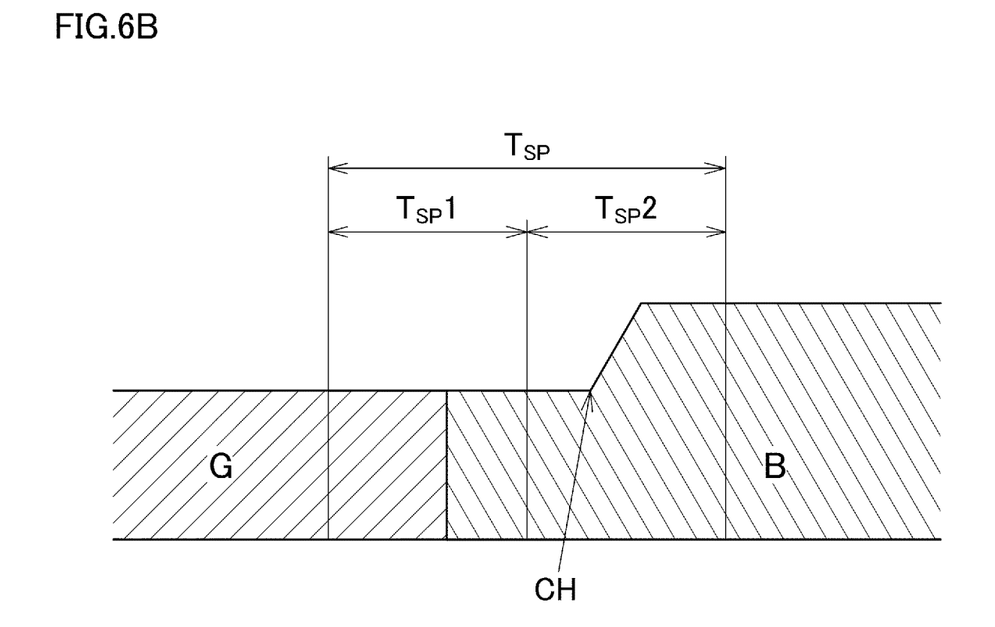
FIG. 6B is an enlarged timing chart of a predetermined spoke period of the projector according to the embodiment of the present invention, the predetermined spoke period shown being a spoke period in a brightness-stressed color mode.

FIGS. 6A and 6B show partially enlarged timing charts of a spoke periods Tsp in the period T12 in FIG. 5 during which light in the cyan wavelength range (CY) is emitted with amounts of lights being expressed in a height direction. As shown in FIGS. 6A, 6B, a spoke period Tsp is formed by a first angular range Tsp1 and a second angular range Tsp2. In the present embodiment, the first angular range Tsp1 and the second angular range Tsp2 are both set at 6 degrees.

In FIG. 6A, the first angular range Tsp1 is referred to as a plane period that is set as a period during which only light in the green wavelength range (G) is shined. Then, the second angular range Tsp2 is referred to as a color mixing period that is set as a period during which light in the green wavelength range (G) and light in the blue wavelength range (B) are shined together. In other words, in the spoke period Tsp, the period during which light in the green wavelength range is shined is longer than the period during which light in the blue wavelength range is shined. In this way, the timing setting module 53 sets the timing at which lights the light source unit 60 emits are switched over and the spoke period Tsp (a ratio of the period during which light in the blue wavelength range is shined to the period during which light in the green wavelength range is shined).

Figure 7A:
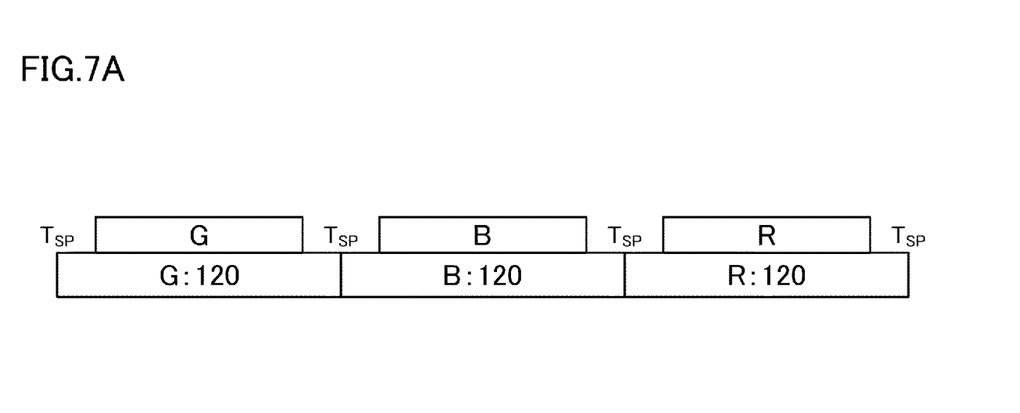
FIG. 7A is a schematic drawing showing allocation ranges of colors of green, blue and red in the projector according to the embodiment of the present invention, the allocation ranges being for normal times.
Figure 7B:
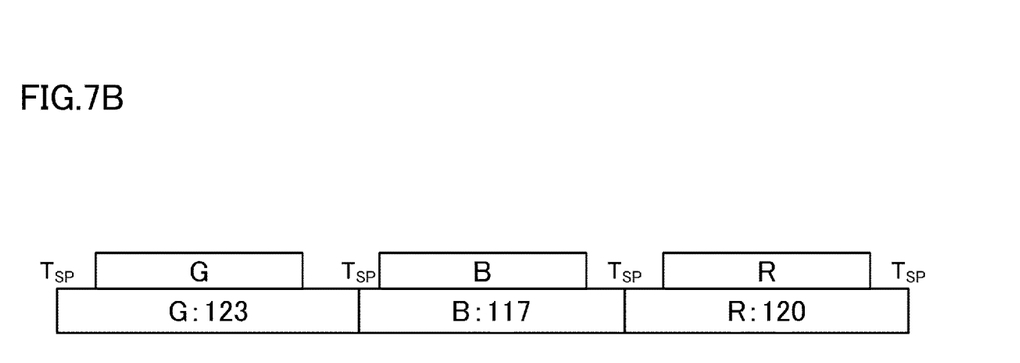
FIG. 7B is a schematic drawing showing allocation ranges of colors of green, blue and red in the projector according to the embodiment of the present invention, the allocation ranges being for the brightness-stressed color mode.

Then, for example, in a system in which angular ranges are allocated such that green light area (G):blue light area (B):red light area (R)=120:120:120, and spoke periods Tsp are set at 12 degrees, as shown in FIG. 7A, the angular range of the green light area can be increased by setting the relevant angular range at 123 degrees, as shown in FIG. 7B. Here, when it is stated that the "angular range of the green light area is increased", the statement does not actually mean that the angular range in which light in the green wavelength range is emitted is increased but means an angular range including usage of the spoke period Tsp (for example, a secondary boost in which white light or a mixed color of light is used). In the present embodiment, as a result of the angular range of the green light area (G) becoming 123 degrees, a color mode can be realized in which stress is laid on the brightness of projected light.

Additionally, in the second angular range Tsp2, which is the color mixing period, a delay time is set for a light emitting timing of the semiconductor light emitting device (a delay control). Here, the delay control will be as follows. An amount of light of the blue laser diode 71, which is the semiconductor light emitting device, is calculated based on a current value and a time. Additionally, the blue laser diode 71 indicates various current value waveforms when it builds up (falls). Current value waveforms at the time of building up (falling) are also caused to change by color modes (that is, driving currents). Then, in the case that an amount of light in the blue wavelength range changes for a spoke period Tsp of each image frame, discontinuous gradational points may be caused to appear in a projected image. Thus, in order to make an amount of light in the blue wavelength range when the blue laser diode 71 builds up (falls) uniform, a delay time is set for the light emitting timing of the blue laser diode 71.

Specifically, an amount of light of the blue laser diode 71 is calculated by detecting a current value of the blue laser diode 71 by the detection module 56. Then, a delay time for the light emitting timing of the blue laser diode 71 in the color mixing period (the second angular range Tsp2) based on information indicating the amount of light obtained by the detection module 56 is set. The light source driving module 55 drives the light source unit 60 (a light source unit) via the light source control circuit 41 based on the settings at the timing setting module 53 and the delay time setting module 54.

In FIG. 6A, the current value of the blue laser diode 71 is changed within the plane period (the first angular range Tsp1) (reference character CH). This can avoid a change in light amount (current value) within the color mixing period (the second angular range Tsp2) that affects a gradational expression.

In FIG. 6B, the first angular range Tsp1 is set as the color mixing period during which light in the green wavelength range (G) and light in the blue wavelength range (B) are shined together. Then, the second angular range Tsp2 is set as the plane period during which only light in the blue wavelength range (B) is shined. In other words, in the spoke period Tsp, the period during which light in the blue wavelength range is shined is longer than the period during which light in the green wavelength range is shined. In this way, the timing setting module 53 sets the timing at which lights the light source unit 60 emits are switched over and the spoke period Tsp (a ratio of the period during which light in the blue wavelength range is shined to the period during which light in the green wavelength range is shined).

Figure 7C:
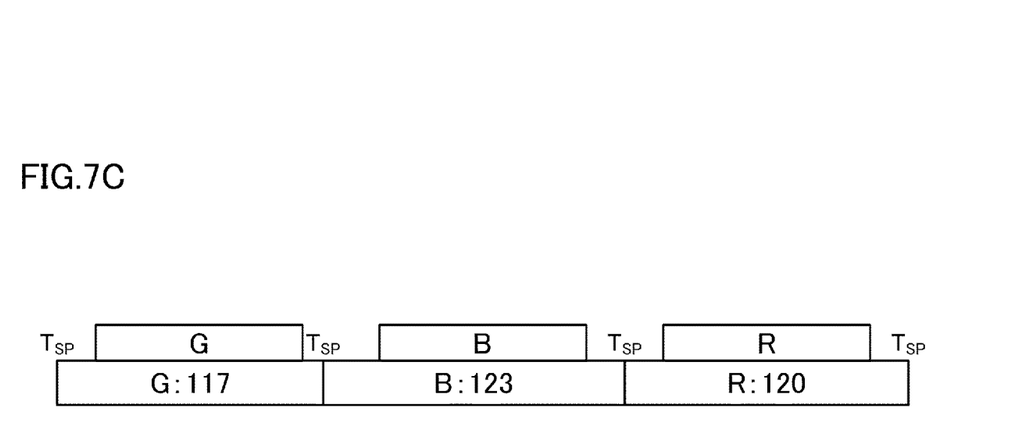
FIG. 7C is a schematic drawing showing allocation ranges of colors of green, blue and red in the projector according to the embodiment of the present invention, the allocation ranges being for the color-stressed color mode.

Then, for example, the angular range of the blue light area (B) can be set at 123 degrees, as shown in FIG. 7C. In this way, a color-stressed color mode in which a color temperature of projected light is increased can be realized by increasing the blue light area (B) by making use of the spoke period Tsp.

Additionally, a delay control similar to the one described above is executed in the first angular range Tsp1, which constitutes the color mixing period, and the timing setting module 53 sets a delay time. Similarly, the light source driving module 55 drives the light source unit 60 (the light source unit) via the light source control circuit 41 based on the settings at the timing setting module 53 and the delay time setting module 54. In addition, in FIG. 6B, the current value of the blue laser diode 71 is changed within the plane period (the second angular range Tsp) (reference character CH).

In this way, by detecting the current value of the blue laser diode 71 by the timing setting module 53, in the spoke period having the plane period during which either of light in the blue wavelength range (light in the first wavelength range) and light in the green wavelength range (light in the second wavelength range) is shined and the color mixing period during which light in the first wavelength range and light in the second wavelength range are both shined together, the ratio of the period during which light in the first wavelength range is shined to the period during which light in the second wavelength range is shined is changed for each of the plurality of color modes. Thus, since the ratio of the period during which light in the first wavelength range is shined to the period during which light in the second wavelength range is shined is changed, a ratio of the amount of light in the first wavelength range to the amount of light in the second wavelength range can be changed.

In the present embodiment, while the information indicating the amount of blue light emitted from the projection optical system 220 within the spoke period Tsp is detected by measuring the current value of the blue laser diode 71 by the detection module 56, the present invention is not limited to this configuration, and hence, for example, an illuminance sensor may be provided so as to function as a detection module configured to detect information indicating amounts of colors of light by detecting an illuminance of projected image. In the present embodiment, while the delay control is described as being applied to the blue laser diode 71, a delay control can be executed on the red light emitting diode 121.

In the present embodiment, while the angle of the spoke period Tsp is set at 12 degrees, the present invention is not limited this configuration, and hence, the angle of the spoke period Tsp may be set at, for example, 17 degrees. In this case, the first angular range Tsp1 can be set at 6 degrees, the second angular range Tsp2 can be set at 6 degrees, and the third angular range Tsp3 can be set at 5 degrees. In this case, too, the first angular range Tsp1 or the third angular range Tsp3 can be set as the color mixing period, while the other angular range can be set as the plane period.

Thus, according to the embodiment of the present invention, the light source unit 60 (the light source unit) includes the excitation light shining device 70 (the first light source) for emitting light in the blue wavelength range (light in the first wavelength range) and the green light source device 80 (the luminescent wheel device 100) (the second light source) for emitting light in the green wavelength range (light in the second wavelength range). The timing setting module 53 changes the ratio of the plane period during which either of light in the blue wavelength range and light in the green wavelength range is shined to the color mixing period during which both light in the blue wavelength range and light in the green wavelength range are shined in the spoke period Tsp for each of the plurality of color modes.

As a result, in the projector 10, although the angle of the spoke period Tsp cannot be changed, the distribution (the balance) of the spoke period Tsp can be changed by changing the state thereof, whereby the brightness of the spoke period Tsp is changed even though the angle thereof cannot be changed, thereby making it possible to improve the degree of freedom in allocating angles to the colors of green, blue and red.

The luminescent wheel 101 of the luminescent wheel device 100 includes the luminescent light emitting area 310 configured to emit luminescent light excited by excitation light (light in the blue wavelength range) emitted from the excitation light shining device 70 and the transmission area 320, both the areas being formed on the luminescent wheel 101. The color wheel 201 of the color wheel device 200 includes the blue and red transmission area 420 configured to transmit light in the red wavelength range contained in light in the green wavelength range and light in the blue wavelength range and the all color transmission area 410, both the areas being formed on the color wheel 201. Here, the luminescent wheel 101 and the color wheel 201 are rotated in synchronism with each other by the controller 38 (the light source driving module 55). As a result, even with the projector 10 including the two wheels in which the allocation of angles to the colors of green, blue and red is limited, the degree of freedom in allocating angles to the colors of green, blue and red can be improved.

The plurality of color modes includes the brightness-stressed color mode and the color-stressed color mode. In the spoke period Tsp in the brightness-stressed color mode, the period during which light in the green wavelength range is shined is longer than the period during which light in the blue wavelength range is shined, while in the spoke period Tsp in the color-stressed color mode, the period during which light in the blue wavelength range is shined is longer than the period during which light in the green wavelength range is shined. This can provide the projector 10 including the color mode in which stress is laid on brightness to realize bright projected light and the color mode in which stress is laid on coloring to realize bright tonality.

The light source unit 60 includes the red light source device 120 (the third light source) for emitting light in the red wavelength range including a partial wavelength range of luminescent light in the green wavelength range. As a result, even in the projector 10 which can brighten projected light in the red wavelength range by making use of the partial wavelength range of the luminescent light, the degree of freedom in allocating angles to the colors of green, blue and red can be improved.

The timing setting module 53 is configured to change the current value of the blue laser diodes 71 within the plane period. As a result, a change in light amount due to a change in current value can be prevented from occurring within the color mixing period.

The controller 38 of the projector 10, which also functions as the projection control device, includes the timing setting module 53 and the light source driving module 55. Then, the controller 38 is allowed to function as the timing setting module 53 and the light source driving module 55 by the program stored in the storage module such as an S-RAM or the like which is connected with the controller 38. This can provide the projection control device and the program which can realize the various color modes by improving the degree of freedom in allocating angles to the colors of green, blue and red.

While the embodiment of the present invention has been described heretofore, the embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A projector comprising:
    a light source unit comprising a first light source configured to emit light in a first wavelength range and a second light source configured to emit light in a second wavelength range;
    a mode setting module configured to set either a first color mode or a second color mode as a setting related to driving current values for the first light source and the second light source; and
    a light source driving module that drives the light source unit so as to change a ratio of a period during which light in the first wavelength range is shined to a period during which light in the second wavelength range is shined in a spoke period having a plane period during which either of light in the first wavelength range and light in the second wavelength range is shined and a color mixing period during which both light in the first wavelength range and light in the second wavelength range are shined by the first color mode and the second color mode,
    wherein the light source driving module shines only light in the second wavelength range of light in the first wavelength range and light in the second wavelength range as the plane period, and then the light source driving module drives the light source unit so as to shine both light in the first wavelength range and light in the second wavelength range as the color mixing period in a spoke period when the first color mode is set by the mode setting module, and
    wherein the light source driving module shines both light in the first wavelength range and light in the second wavelength range as the color mixing period, and then the light source driving module drives the light source unit so as to shine only light in the first wavelength range of light in the first wavelength range and light in the second wavelength range as the plane period in a spoke period when the second color mode is set by the mode setting module.

2. The projector according to claim 1,
    wherein the second light source comprises a luminescent wheel device comprising a luminescent wheel comprising a luminescent light emitting area configured to be excited by light in the first wavelength range to emit light in the second wavelength range which is luminescent light and a transmission area configured to transmit light in the first wavelength range, the luminescent light emitting area and the transmission area being formed on the luminescent wheel.

3. The projector according to claim 2,
wherein the light source unit comprises a color wheel device comprising a color wheel comprising a predetermined wavelength range transmission area configured to transmit light in a predetermined wavelength range contained in light in the second wavelength range and light in the first wavelength range and an all color transmission area, the predetermined wavelength transmission area and the all color transmission area being provided on the color wheel.

4. The projector according to claim 3,
wherein the light source unit comprises a third light source configured to emit light in a third wavelength range containing a wavelength range of light in the predetermined wavelength range.

5. The projector according to claim 4,
wherein the predetermined wavelength range transmission area is formed so as to transmit light in the third wavelength range.

6. The projector according to claim 3,
wherein light in the first wavelength range is light in a blue wavelength range, and light in the second wavelength rage is light in a green wavelength range.

7. The projector according to claim 3,
wherein the first light source is a laser diode.

8. The projector according to claim 2,
wherein light in the first wavelength range is light in a blue wavelength range, and light in the second wavelength rage is light in a green wavelength range.

9. The projector according to claim 2,
wherein the first light source is a laser diode.

10. The projector according to claim 1,
wherein the plurality of color modes comprises a brightness-stressed color mode and a color-stressed color mode.

11. The projector according to claim 10,
wherein the light source unit comprises a third light source configured to emit light in a third wavelength range containing a wavelength range of light in the predetermined wavelength range.

12. The projector according to claim 10,
wherein light in the first wavelength range is light in a blue wavelength range, and light in the second wavelength rage is light in a green wavelength range.

13. The projector according to claim 1,
wherein light in the first wavelength range is light in a blue wavelength range, and light in the second wavelength rage is light in a green wavelength range.

14. The projector according to claim 1,
wherein the first light source is a laser diode.

15. The projector according to claim 1,
the second light source emits light in the second wavelength range receiving light in the first wavelength range as excitation light,
the light source driving module drives the light source unit so as to change the amount of light in the first wavelength range from the first light source during the plane period regardless of whether the first color mode or the second color mode is set by the mode setting unit.

16. The projector according to claim 1, further comprising:
a display device on to which light source light is shined from the light source unit to form image light;
a projection optical system configured to project the image light emitted from the display device onto a projection target.

17. The projector according to claim 1,
wherein the light source driving module drives the light source unit so that a period during which light in the second wavelength range is shined to be longer than a period during which light in the first wavelength range is shined in a spoke period when the first color mode is set by the mode setting module, and
wherein the light source driving module drives the light source unit so that a period during which light in the first wavelength range is shined to be longer than a period during which light in the second wavelength range is shined in a spoke period when the second color mode is set by the mode setting module.

18. A projection control device comprising:
a mode setting module configured to set either a first color mode or a second color mode as a setting related to driving current values for a first light source and a second light source with respect to a light source unit comprising the first light source configured to emit light in the first wavelength range and the second light source configured to emit light in the second wavelength range; and
a light source driving module that drives the light source unit so as to change a ratio of a period during which light in a first wavelength range is shined to a period during which light in a second wavelength range is shined, the light in the first wavelength range and the light in the second wavelength range being emitted from the light source unit, in a spoke period having a plane period during which either of light in the first wavelength range and light in the second wavelength range is shined and a color mixing period during which both light in the first wavelength range and light in the second wavelength range are shined by the first color mode and the second color mode,
wherein the light source driving module shines only light in the second wavelength range of light in the first wavelength range and light in the second wavelength range as the plane period, and then the light source driving module drives the light source unit so as to shine both light in the first wavelength range and light in the second wavelength range as the color mixing period in a spoke period when the first color mode is set by the mode setting module, and
wherein the light source driving module shines both light in the first wavelength range and light in the second wavelength range as the color mixing period, and then the light source driving module drives the light source unit so as to shine only light in the first wavelength range of light in the first wavelength range and light in the second wavelength range as the plane period in a spoke period when the second color mode is set by the mode setting module.

19. A non-transitory storage medium that a computer can read, the storage medium being configured to cause the computer to function as:
a mode setting module configured to set either a first color mode or a second color mode as a setting related to driving current values for a first light source and a second light source with respect to a light source unit comprising the first light source configured to emit light in the first wavelength range and the second light source configured to emit light in the second wavelength range; and
a light source driving module that drives the light source unit so as to change a ratio of a period during which light in a first wavelength range is shined to a period during which light in a second wavelength range is shined, the light in the first wavelength range and the light in the second wavelength range being emitted from the light source unit, in a spoke period having a plane period during which either of light in the first wavelength range and light in the second wavelength range is shined and a color mixing period during which both light in the first wavelength range and light in the second wavelength range are shined by the first color mode and the second color mode, wherein the light source driving module shines only light in the second wavelength range of light in the first wavelength range and light in the second wavelength range as the plane period, and then the light source driving module drives the light source unit so as to shine both light in the first wavelength range and light in the second wavelength range as the color mixing period in a spoke period when the first color mode is set by the mode setting module, and wherein the light source driving module shines both light in the first wavelength range and light in the second wavelength range as the color mixing period, and then the light source driving module drives the light source unit so as to shine only light in the first wavelength range of light in the first wavelength range and light in the second wavelength range as the plane period in a spoke period when the second color mode is set by the mode setting module.

\* \* \* \* \*

UNITED STATES PATENT AND TRADEMARK OFFICE
CERTIFICATE OF CORRECTION

| | | |
|---|---|---|
| PATENT NO. | : 11,392,018 B2 | Page 1 of 1 |
| APPLICATION NO. | : 16/824334 | |
| DATED | : July 19, 2022 | |
| INVENTOR(S) | : Kiyoshi Oda et al. | |

It is certified that error appears in the above-identified patent and that said Letters Patent is hereby corrected as shown below:

On the Title Page

Item (57), Abstract, Column 2, Line 13, delete "alight" and insert -- a light --.

In the Claims

Claim 6, Column 15, Line 24, delete "rage" and insert -- range --.
Claim 8, Column 15, Line 30, delete "rage" and insert -- range --.
Claim 12, Column 15, Line 45, delete "rage" and insert -- range --.
Claim 13, Column 15, Line 49, delete "rage" and insert -- range --.

Signed and Sealed this
Seventh Day of February, 2023

Katherine Kelly Vidal
*Director of the United States Patent and Trademark Office*